H. VERMILLION.
Corn Planter.

No. 9,374.

Patented Nov. 2, 1852.

UNITED STATES PATENT OFFICE.

HENRY VERMILLION, OF RISING SUN, MARYLAND.

IMPROVEMENT IN SEED-PLANTERS.

Specification forming part of Letters Patent No. 9,374, dated November 2, 1852.

*To all whom it may concern:*

Be it known that I, HENRY VERMILLION, of Rising Sun, in the county of Cecil and State of Maryland, have invented certain new and useful Improvements in Seeding-Machines; and I do hereby declare the following to be a full, clear, and exact description of the construction and operation thereof, reference being had to the accompanying drawings and letters of reference marked thereon, forming part of this specification, in which—

Figure 1:
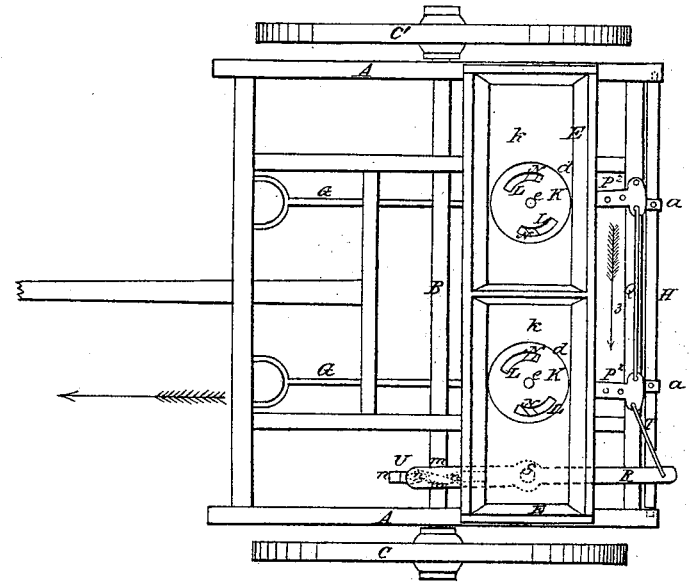
Figure 2:
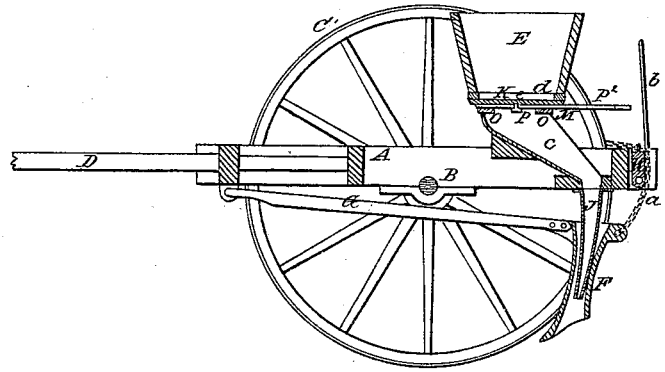
Figure 5:
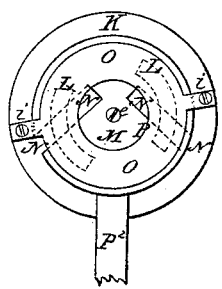
Figure 3:
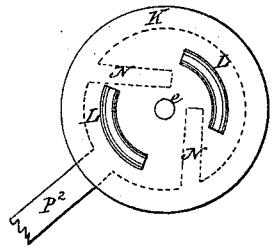
Figure 4:
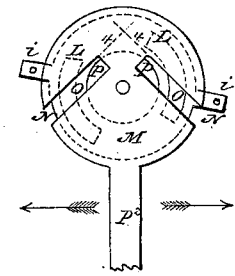

Figure 1 is a plan view of the machine. Fig. 2 is a vertical section taken centrally through one of the distributers of the hopper. Fig. 3 is a plan view of the top plate of one of the distributers, showing the segmental openings therein as closed by the oscillating plate to stop the distribution of the seed. Fig. 4 is a plan view of the oscillating plate, the red lines indicating the relative position of the segmental receiving-openings, with the oblique discharging-openings in the oscillating plate. Fig. 5 is an inverted view of the distributer, the red lines also showing the positions of the segmental and the dotted lines the oblique openings.

Where the same letters occur on the several figures they indicate the same parts.

My invention refers to the distributing apparatus of seed-planters; and the nature of it consists in the novel employment of an oscillating plate beneath the bottom of the hopper, having oblique openings on opposite sides of the center of the plate, relatively situated in connection with segmental or other similar shaped openings above said oscillating plate, as well as to a bottom ring-plate containing a central annular opening, the effect of this being thus: During the oscillation of the plate the seed is received in its oblique openings (the bottoms whereof at their intersection with the segmental openings being formed by the ring-plate) and simultaneously four discharges of the seed take place—two from the centerward ends of the openings through the annular central opening of the ring-plate, and two from the outlets of said oblique openings over the circumference of the ring-plate—the reception of the seed into the segmental openings being uninterrupted. Its discharge from the oblique openings of the oscillating plate is almost continuous, and susceptible of regulation as to the quantity per acre with the desired accuracy.

To enable others to make and use my invention, I will proceed fully to describe it.

A is the frame, mounted in the usual manner upon an axle, B, supported by fast and loose wheels $c$ $c'$.

D is the tongue or draft-pole. On the frame A, a short distance above the same, is mounted the hopper E, having the usual compartments.

F represents one of the depositing-tubes or drill-teeth, connected by the drag-bar G to the front beam of the frame, and by a cord or chain, $a$, to a turning-bar or lever, H, pivoted to the side beams of the frame, and furnished with an arm or handle, $b$, whereby the bar or lever H may be turned upward to elevate the drill-teeth, when desired, and confined by any convenient means, as seen in Fig. 2.

J is a flexible conducting-tube for receiving the seed from a spout, $c$, inclining rearward from the bottom of the hopper, and conducting it into the depositing-tube.

The construction and arrangement of the parts above referred to are common to most seeding-machines in use, and therefore need no further description.

It will be understood that my machine is furnished with the required number of depositing-tubes, with the appliances necessary to their attachment to and operation with the machine. Directly beneath a circular opening, $d$, formed in each compartment of the hopper there is confined by means of screw-bolts a circular plate, K, having on either side of its center segmental or other similar openings, L, of suitable length and breadth, and always open to the hopper for the reception of the seed.

Beneath the plate K, and adjacent thereto, is connected by means of a central pivot-bolt, $e$, an oscillating plate, M, having on either side of its center oblique openings N, each extending to the circumference of the plate and forming an outlet or mouth. These two openings lie at right angles to each other, as indicated by the dotted red lines 4 4, Fig. 4; or they may be situated relatively in the plate at a greater or less angle, as may be desired.

Beneath the oscillating plate M, and adjacent thereto, there is a bottom ring-plate, O, held to its place by screw-bolts passing through ears $i$ $i$ into the upper plate. It has a central annular opening, P, of sufficient diameter to expose the centerward or adjacent ends of the oblique openings N. (See Figs. 4 and 5.) The diameter of the oscillating plate is somewhat greater than that of the bottom ring-plate, so that the circumference of the former shall project beyond the circumference of the latter to expose the outlets of the openings, and thus facilitate the discharge of the seed through said outlets during the oscillation of the plate.

Now, it will be seen by reference to Figs. 4 and 5 that the oblique openings N in the oscillating plate M cross the segmental receiving-openings L diagonally, and at said intersection the seed is received into the opening of the oscillating plate, the bottom of a portion thereof being formed by the ring-plate, O, as seen in Fig. 4. During the oscillation of the plate M the area of the intersecting openings—that is, where the two openings intersect each other—remains the same, and the centerward ends of the oblique openings are always exposed or open to the central annular opening, P, of the ring-plate, as shown in Fig. 4, so that on each oscillation of the plate M the relative obliquity of the sides of the openings N with the segmental openings L causes the seed to feed regularly and simultaneously toward either end of each opening—that is, toward the center as well as the circumference of the plate—whereby the seed is discharged from either end of the oblique openings simultaneously, making four discharges during every oscillation of the plate—two through the central annular opening of the ring-plate and two over the circumference of said plate—thus rendering the feed and discharge of the seed uninterrupted during the progress of the machine.

From each oscillating plate projects rearward an arm, P², united to each other by connecting-rods Q, and to a lever or vibrating arm, R, having its fulcrum at S, by a rod, T. The inner end of the lever or arm R is furnished with double inclined planes, $m$ $m$, between and against which act diamond-shaped projections $n$ on the periphery of a wheel, U, on the propelling-shaft B, the said projections $n$ having double-inclined sides, which, during the revolutions of the wheel U, impart to the lever R a vibratory movement, and through means of the connecting-rods T Q communicate the same movement to the arms P², and thus simultaneously oscillate the feeding and discharging plate M of each distributer, there being one distributer to each depositing-tube.

The distribution of the seed may be regulated as to the quantity to be sown per acre by increasing or diminishing the amount of stroke or movement of the arm P² of each distributer, which will, in the same ratio, give more or less movement to the oblique openings, and thus the feed of the seed will be retarded or facilitated. This is done by changing the connections of the rods Q with the arms P² nearer to or farther from the center of each distributer.

In order to check the distribution of the seed, the rod T need only be disconnected from the vibrating bar R, and the arms P² turned toward said bar R, as indicated by the arrow 3, Fig. 1, until the oblique openings are covered by the top plate, K, as shown in Fig. 3. The segment-openings in the top plate are set slightly obliquely in relation to the length of the hopper, as illustrated by the red lines $k$ $k$, Fig. 1, for the purpose of allowing the oblique openings to be closed without turning the arms P² entirely beneath the bottom of the hopper.

Having thus described my improvement in the distributing apparatus of seed-planters, it will be understood that I do not mean to claim the use of a reciprocating gage-plate, having oblique feed-openings therein, operating in combination with openings of different obliquity in the grating-plates and bottom of the hopper for increasing or diminishing the feed of the seed to be sown while the machine is in motion, by increasing or diminishing the traverse or sliding movement of the gage-plate; but

What I do claim as my invention, and desire to secure by Letters Patent, is—

The employment of the pivoted oscillating plate M, when made with oblique openings N on opposite sides of its center, reaching to and forming outlets at the circumference of said plate, in combination with segmental or other similar openings, L, above the oblique openings and a central annular opening, P, in the ring-plate O, whereby during the oscillation of the pivoted plate M the seed is not only discharged from the outlets of the oblique openings over the circumference of the ring-plate, but also through the central annular opening, P, of the ring-plate from the centerward ends of the oblique openings.

In testimony whereof I have hereunto signed my name before two subscribing witnesses.

H. VERMILLION.

Witnesses:
WM. P. ELLIOT,
O. T. VERMILLION.